US010846192B2

(12) United States Patent
Gaonkar et al.

(10) Patent No.: US 10,846,192 B2
(45) Date of Patent: Nov. 24, 2020

(54) TRANSACTION-BASED EVENT TRACKING MECHANISM

(71) Applicant: Cisco Technology, Inc., San Jose, CA (US)

(72) Inventors: Kedar K. Gaonkar, San Jose, CA (US); Rajesh Pazhyannur, Fremont, CA (US); Aruna Nukala, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 97 days.

(21) Appl. No.: 16/177,147

(22) Filed: Oct. 31, 2018

(65) Prior Publication Data
US 2020/0133815 A1 Apr. 30, 2020

(51) Int. Cl.
G06F 11/34 (2006.01)
G06F 11/07 (2006.01)
H04L 12/26 (2006.01)
H04L 29/08 (2006.01)
H04W 24/00 (2009.01)

(52) U.S. Cl.
CPC ...... G06F 11/3409 (2013.01); G06F 11/0709 (2013.01); G06F 11/3495 (2013.01); H04L 43/04 (2013.01); H04L 43/06 (2013.01); H04L 67/303 (2013.01); H04W 24/00 (2013.01); G06F 2201/87 (2013.01)

(58) Field of Classification Search
CPC ............. G06F 11/3409; G06F 11/0709; G06F 11/3495; G06F 2201/87; H04W 24/00; H04L 43/06; H04L 67/303; H04L 43/04
See application file for complete search history.

(56) References Cited

U.S. PATENT DOCUMENTS

| 6,745,011 | B1 | 6/2004 | Henerickson et al. |
| 8,874,733 | B2 | 10/2014 | Mitchell et al. |
| 9,813,393 | B2 | 11/2017 | Consalus et al. |
| 10,148,533 | B1 * | 12/2018 | Hull ........................ H04L 43/04 |
| 2002/0129137 | A1 | 9/2002 | Mills, III et al. |

(Continued)

FOREIGN PATENT DOCUMENTS

CN 110278234 A * 9/2019

OTHER PUBLICATIONS

The PCT Searhc Report and Written Opinion dated Feb. 4, 2020 for PCT Application No. PCT/US19/58352, 10 pages.

Primary Examiner — Oanh Duong
(74) Attorney, Agent, or Firm — Lee & Hayes, P.C.

(57) ABSTRACT

A request is received from a client device to connect to a wireless network associated with a cloud computing device. A first notification is received to indicate that a first client transaction has started. Using a first timer, a first timestamp associated with a start time of the first client transaction is identified. A first data frame having the first client transaction and the first timestamp is generated. A second notification indicating that the first client transaction has completed is received. Using the first timer, a second timestamp associated with an end time of the first client transaction is identified. Using the second timestamp, the first data frame is updated using the second timestamp. The first data frame is sent to the cloud computing device.

20 Claims, 4 Drawing Sheets

(56) References Cited

U.S. PATENT DOCUMENTS

| | | | |
|---|---|---|---|
| 2005/0021708 A1* | 1/2005 | Raghuraman | G06Q 10/10 |
| | | | 709/223 |
| 2006/0217116 A1 | 9/2006 | Cassett et al. | |
| 2010/0058345 A1* | 3/2010 | Seidman | G06F 11/3419 |
| | | | 718/101 |
| 2011/0213879 A1 | 9/2011 | King et al. | |
| 2013/0046779 A1* | 2/2013 | Gagliardi | G06F 11/3495 |
| | | | 707/769 |
| 2013/0268357 A1* | 10/2013 | Heath | H04L 63/00 |
| | | | 705/14.53 |
| 2014/0108646 A1* | 4/2014 | Cheung | G06F 8/00 |
| | | | 709/224 |
| 2014/0214896 A1 | 7/2014 | Hotta et al. | |
| 2015/0242296 A1* | 8/2015 | Mittal | G06F 11/261 |
| | | | 714/37 |
| 2016/0098697 A1 | 4/2016 | Dunsmore et al. | |
| 2016/0255538 A1* | 9/2016 | Savarimuthu | H04W 28/08 |
| | | | 370/329 |
| 2017/0286440 A1* | 10/2017 | Jung | G06F 16/137 |
| 2017/0300955 A1* | 10/2017 | White | G06Q 30/0235 |
| 2018/0012479 A1* | 1/2018 | Seaton | H04L 12/2823 |
| 2019/0205929 A1* | 7/2019 | Snibbe | G06K 9/00677 |
| 2019/0238958 A1* | 8/2019 | Kopp | G01J 5/06 |
| 2019/0317836 A1* | 10/2019 | Kuzior | G06F 9/542 |
| 2019/0356535 A1* | 11/2019 | Li | H04L 43/0811 |

\* cited by examiner

| Transaction Type | Start Time | Authentication time | DHCP time | ... | ... | Result Type | Failure Type |
|---|---|---|---|---|---|---|---|
| | T1 | | | | | | |
| 110 | 120 | 130 | 140 | | | 150 | 160 |

FIG. 1A

| Transaction Type | Start Time | Authentication time | DHCP time | ... | ... | Result Type | Failure Type |
|---|---|---|---|---|---|---|---|
| Incomplete | T1 | T auth | | | | | |
| 110 | 120 | 130 | 140 | | | 150 | 160 |

FIG. 1B

| Transaction Type | Start Time | Authentication time | DHCP time | ... | ... | Result Type | Failure Type |
|---|---|---|---|---|---|---|---|
| Incomplete | T1 | T auth | | | | Failed | 8021_x Authentication Failure |
| 110 | 120 | 130 | 140 | | | 150 | 160 |

FIG. 1C

TRANSACTION-BASED EVENT TRACKING MECHANISM

FIELD OF THE DISCLOSURE

One technical field of the present disclosure is tracking of wireless client events in cloud computing environments. Another technical field is real-time monitoring and transaction-based event tracking by edge-computing devices. Another technical field is data export optimization of the network traffic.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Wireless access points and wireless Local Area Network (LAN) controllers track wireless client events which are associated with the Wi-Fi network and build telemetry data that can be exported to a cloud analytics platform. The cloud analytics platform provides actionable insights around client connection issues and failures such as slow authentication or slow roaming. The accuracy of the data collected through telemetry is critical to enable network administrators to understand the correct state of any wireless clients on the network and as a source of data to network management systems. This becomes more important for the cloud analytics platform when the scale of wireless clients can be in the hundreds of thousands and the information needs to be processed and efficiently stored in a database.

Existing efforts for tracking wireless client events have been focused on a state of an event. However, the data for the state-based event can differ with each implementation, resulting in an incorrect representation of client event.

BRIEF DESCRIPTION OF THE DRAWINGS

In the drawings:

FIG. 1A, FIG. 1B, and FIG. 1C illustrate example time series tables including various transaction times of a client event;

DETAILED DESCRIPTION

Figure 2:
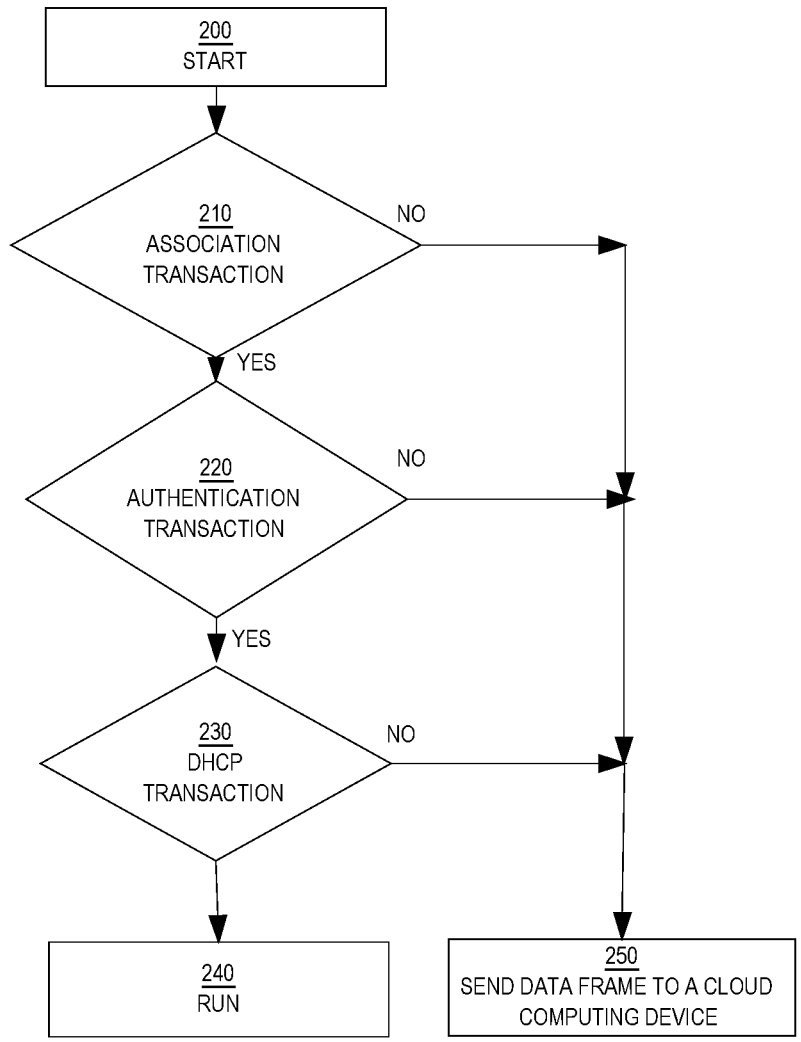
FIG. 2 illustrates processes for a client event sequence.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Embodiments are described in sections below according to the following outline:

1. General Overview

Techniques for tracking and exporting client events based on a transaction in a cloud-based environment are described. The present disclosure models the events associated with wireless networking by defining a transaction of the client event, reducing the memory footprint and providing accurate metrics to represent a client's attempt to connect to the wireless network. Embodiments are useful to track and export client events and state as clients move through different stages of a wireless networking association under IEEE standard 802.11 protocol implementations or other wireless networking protocol implementations. In an embodiment, a transaction model mirrors an attempt to connect to the WiFi network by the end-user, and thus provides more accurate metrics to generate insights that are relevant to a user. The model also makes the data export optimized for bandwidth consumption over the wire and reduces the compute complexity on the cloud analytics platform to make real-time stream processing possible.

In one embodiment, a request is received from a client device to connect to a wireless network associated with a cloud computing device. A first notification is received to indicate that a first client transaction has started. Using a first timer, a first timestamp associated with a start time of the first client transaction is identified. The first transaction can include any of a wireless networking access point association request, an authentication request, a roaming request or a Dynamic Host Configuration Protocol (DHCP) request. A first data frame having the first client transaction and the first timestamp is generated. A second notification indicating that the first client transaction has completed may be received. Using the first timer, a second timestamp associated with an end time of the first client transaction is identified. Using the second timestamp, the first data frame is updated using the second timestamp. The first data frame is sent to the cloud computing device.

2. Structural and Functional Overview 2.1 Wireless Networking Protocol Events and Data Model In an embodiment, for each state machine transition that occurs as a client computing device progresses through establishment of connection using a wireless networking protocol, a record is created in a client events stream. Creating a data model in this manner provides foundation for determining under program control how the client moved through different states of association at different times and has information whether the particular state was completed successfully or with a failure along with other data relevant to the state. Examples of client events are set forth in TABLE 1.

TABLE 1

EXAMPLES OF CLIENT EVENTS IN A WIRELESS NETWORKING PROTOCOL

| Event Type | Comments on events |
| --- | --- |
| ASSOC_START | Logged when association request is received |
| ASSOC_DONE | Logged when association response is sent for successful case |
| AUTH_START | logged only for 802.1x when eap-id request is sent to the client |
| AUTH_DONE | Logged when AAA response is received on the authentication result. |

TABLE 1-continued

EXAMPLES OF CLIENT EVENTS IN A
WIRELESS NETWORKING PROTOCOL

| Event Type | Comments on events |
| --- | --- |
| L2KEY_DONE | logged only for 802.1x and PSK when 4 way key exchange is done. For wpa2 it is after key4 and for wpa it is after key6. |
| MOBILITY_DONE | Logged when client learns its role (local, anchor, foreign) |
| DHCP_DONE | Logged only when ipaddress is learnt via static (arp) or dhcp. Not when ipaddress is learnt via handoff (mobility) |
| RUN | Logged when client can pass traffic |

A sample output of client events data stream for a client association is set forth in TABLE 2:

TABLE 2

EXAMPLE CLIENT EVENTS DATA STREAM

WLC-Name Timestamp Event Result Reason FIELDS
37 test-5520 1505855563192549 ASSOC_START SUCCESS (1 ) ASSOC
ssid:test-dot1x, apmac:28:6F:7F:5C:13:20, slot:1,
38 test-5520 1505855563192745 ASSOC_DONE SUCCESS (0 ) NO_REASON
ssid:test-dot1x,
39 test-5520 1505855563195404 AUTH_START SUCCESS (0 ) NO_REASON
40 test-5520 1505855563290301 AUTH_DONE SUCCESS (89 ) DOT1X_FULL_AUTH
user:test-login, svr:172.19.220.69
41 test-5520 1505855563299791 L2KEY_DONE SUCCESS (0 ) NO_REASON
42 test-5520 1505855563299882 MOBILITY_DONE SUCCESS (147)
MM_HANDOFF_TIMEOUT role:1,
43 test-5520 1505855563299977 DHCP_DONE SUCCESS (192) IPLEARN_STATIC
ipv4:0.0.0.0, ipv6:2001:20:20:20:7415:c7ff:2f4:50fb, svr:0.0.0.0
44 test-5520 1505855563299989 RUN SUCCESS (0 ) NO_REASON ipv4:0.0.0.0,
ipv6:2001:20:20:20:7415:c7ff:2f4:50fb, role:1, While the foregoing representation of client onboarding events keyed by state machine transitions is useful, improvements are possible. As the client is associating or roaming or running applications, an analytics platform needs to present insights on onboarding experience as well as connected experience. Some of the key insights for onboarding experience include: Time taken from start of association to the time when client can pass traffic; Time taken for client to complete a roam from one AP to another; Time taken to completed authentication; Time taken to complete DHCP IP address learning; Number of retries during the onboarding processes in one attempt to associate; Failures experienced during onboarding.

To generate these insights, if the client events records are generated for each state machine movement (example above), then the stream processing pipeline in a cloud-based analytics computing instance would need to maintain a window to collect all the events for a particular client MAC address from start of onboarding until it reaches a terminal state. At large scale, this becomes a problem, as the pipeline would have to maintain state for the transaction in that time window. The number of records generated for an association attempt is also very high because a record is created for every state machine movement. Therefore, in embodiments, event data is transformed to transactions by performing analytics in an edge computing device and by exporting records of transactions. By pushing creation of concept of transaction to edge computing devices in networks, pipelines in a cloud analytics platform can be stateless.

In an embodiment, a transaction comprises a series of client events for a given client that starts with an Association Request and ends either with a Run event or any other event with result type of failure.

In a wireless network, the most relevant insights are based on real-time tracking of issues with the client from the perspective of end-user experience. One attempt of the end-user to connect to the network may have multiple repetitive client state machine movements. For example, the following event sequence is commonly seen for an association attempt in a production network that we have been collecting data from:

ASSOC_START
ASSOC_DONE
ASSOC_START
ASSOC_DONE
<above cycle repeats a few times>
AUTH_START
AUTH_DONE
ASSOC_START
ASSOC_DONE
AUTH_START
AUTH_DONE
<above cycle repeats a few times>
L2KEY_DONE
MOBILITY_DONE
DHCP_DONE
RUN From the end-user perspective, all events set forth above represent one connection attempt. Therefore, an analytics platform should calculate and output all metrics for the transaction as a whole. If the foregoing transaction is divided into multiple attempts to associate just because the client state machine moved to ASSOC_START multiple times, then the metrics that an analytics platform generates will not represent the end-user experience correctly.

In an embodiment, client events generated in the foregoing manner are stored in a Redis cache. An analytics module consumes these events pushed into a Redis DB and creates a transaction based on the above definition.

In an embodiment, a data model for a transaction may be defined as:

```
list client-events {
key mac;
leaf mac {
type yang:mac-address;
description "MAC address of the client";
}
list transactions {
key index;
description "this is a circular event queue";
leaf index {
type uint16;
description "Index of the client transaction";
}
leaf transaction-type {
type wlc-client-transaction-type;
description "Type of transaction. Possible values are:
1. Successful association
2. Slow association
3. Failed assocation
4. Successful roam
5. Slow roam
6. Failed roam
7. Incomplete transaction???;
}
leaf start-time {
type uint64;
description "Epoch timestamp at which the client transaction started";
}
leaf auth-time {
type uint32;
description "Time taken to complete authentication";
}
leaf dhcp-time {
type uint32;
description "Time taken to complete DHCP";
}
leaf assoc-result-type {
type wlc-client-event-result-types;
description "Assocation state was completed with success or failure";
}
leaf auth-result-type {
type wlc-client-event-result-types;
description "Authentication completed with success or failure";
}
leaf dhcp-result-type {
type wlc-client-event-result-types;
description "DHCP state completed with success or failure";
}
leaf mobility-result-type {
type wlc-client-event-result-types;
description "Mobility state was learnt with success or failure";
}
leaf assoc-done-reason-type {
type wlc-client-assoc-reason-types;
description "Describes the reason due to which the event is triggered.";
}
leaf auth-done-reason-type {
type wlc-client-auth-reason-types;
description "Describes the reason due to which the event is triggered.";
}
leaf dhcp-done-reason-type {
type wlc-client-dhcp-reason-types;
description "Describes the reason due to which the event is triggered.";
}
leaf mobility-done-reason-type {
type wlc-client-mobility-reason-types;
description "Describes the reason due to which the event is triggered.";
}
leaf slot-id {
type uint8;
description "Slot ID for a client event";
}
leaf ap-mac {
type yang:mac-address;
description "MAC address of the Access point";
}
leaf ssid {
type string;
description "SSID of the client";
}
```

```
leaf ipv4 {
type inet:ipv4-address;
description "IPv4 address of the client";
}
leaf ipv6 {
type inet:ipv6-address;
description "ipv6 address of the client";
}
leaf vlan {
type uint32;
description "VLAN to which the client belongs";
}
leaf dhcp-server-ip {
description "DHCP/Radius Server IP";
type inet:ip-address;
}
leaf aaa-server-ip {
description "RADIUS Server IP";
type inet:ip-address;
}
leaf username {
type string;
description "Username for the client device";
}
leaf mobility-role {
type wlc-mobility-role-Type;
description "Role played by the client";
}
list events {
key index;
description "List of events in this transaction with
time delta from transaction start time";
leaf index {
type uint16;
description "Index of the client event";
}
leaf event-type 1
type wlc-client-event-type;
description "Event type"
}
leaf time-delta }
type uint32;
description "Time delta from start of transaction."
}
}
}
```

By default, when tracking a transaction starts, it is an Incomplete transaction. As the client events are consumed, the columns in this data frame are populated and state is updated. As each client state in the state machine is completed, the time taken in that state is computed and populated in the frame. Each state in the client state machine has a timer associated with it, so either the transaction must progress to the next state, or it will end in a Failed state because of a timeout. Hence transactions do not stay in Incomplete state for a long time. Once a transaction is completed, the data export module will export it to the cloud analytics platform.

The child list of events will carry all the edges with a time delta (lesser memory footprint) in case all the transitions are analyzed. This is particularly useful to analyze the Failed or Incomplete transactions to understand the state machine movements and the last state when the transaction failed or was incomplete.

A sample success transaction record is given below:

WLC-name index Fields
test-5520 8 transaction-type:Success, start-time:1505855563192549
auth-time:94, dhcp-time:102,
slot-id:1, ap-mac:28:6F:7F:5C:13:20, ssid:test-dot1x, ipv4:0.0.0.0, -continued

```
ipv6: 2001:20:20:20:7415:c7ff:2f4:50fb,
vlan:20, dhcp-server:0.0.0.0, aaa-server:172.19.220.69,
username:test-login, mobility-role:1,
events: [1,2,1,2,1,2,1,2,3,1,2,3,1,2,3,4,5,6,7,9]
```

In an embodiment, when a stream processing pipeline in a cloud-based analytics platform receives this record, all the information to generate the insights is already computed and hence can be directly consumed with any more processing.

With this approach, programmed systems can achieve an order of magnitude reduction in the number of data frames that need to be stored and processed by generating transaction-based records. The data model also helps in compressing the amount of data without losing any information about the client event. Having data for a transaction helps in executing computation using edge devices and saves resources on the cloud. The insights and metrics generated by modeling the client events as transaction is more accurate and more relevant to the consumer.

2.2 Time Series

FIG. 1A, FIG. 1B, and FIG. 1C illustrate example time series tables including various transaction times of a client event. Each of these views represents a series of events over time that can be tracked and associated with a transaction by a computer-implemented process that is programmed as further described herein.

Referring first to FIG. 1A, an example time series table including an association time of a client event is shown. The example time series table of FIG. 1A comprises a data structure stored in electronic digital computer memory and organized in a database representing a client connection state. For example, a time series table as represented in FIG. 1A comprises a table with a plurality of columns for recording transaction times and analytics. Each column includes a value for corresponding transaction information such as a start time, an association time, an authentication time, a DHCP time, a transaction type, a result type, or a type of failure. The value for each column is calculated as the transaction is processed.

Embodiments may be implemented using a host computer or a processor of a wireless networking access point programmed to perform processes as follows. In an embodiment, upon receiving a wireless networking access point association request from a client device, the time series table is generated. The client event may include a series of transactions that may comprise an association transaction, an authentication transaction, a DHCP transaction, or mobility transaction. The order and the number of transactions in the client event sequence can vary based on the network configuration.

In some embodiments, the association time 120 indicates the time it takes to complete the association transaction. The authentication time 130 indicates the time it takes to complete the authentication transaction. The DHCP time 140 indicates the time it takes to complete the DHCP IP learning. The result type 150 indicates the type of the transaction state (e.g., successful). The type of failure 160 specifies the reason for the failure (e.g., 802x authentication failure).

As shown in FIG. 1A, upon receiving the request, a time value for the association time is stored in the time series table. The time value can be calculated using a timer associated with the association transaction. Each transaction is associated with a configurable timer that is set to a certain threshold. When the timer expires (i.e., meeting the threshold), the transaction is considered as a "failed transaction" and the process ends. When it is determined that the transaction is successful, the process progresses to the next transaction in the client event sequence.

FIG. 1B illustrates an example time series table including the association time and the authentication time. The authentication transaction may occur after the association transaction in the client event sequence. A timer associated with the authentication transaction may be used to identify a first timestamp associated with a start time of the authentication and a second timestamp associated with an end time of the authentication. The first timestamp and the second timestamp are used to calculate the time it takes for the authentication transaction to complete. The calculated time is recorded in the authentication time field 130.

In some embodiments, the transaction type 110 may indicate that the transaction is "incomplete" when the process is ongoing. The transaction type may be updated to a "successful transaction" when the computing device determines whether the process is successfully performed or a "failed transaction" when the process ends with a failure. The transaction type may include corresponding values for "successful transaction", "slow transaction", "failed transaction", "successful roam", "slow roam", "failed roam", and "incomplete transaction".

FIG. 1C illustrates an example time series table with analytics. If the authentication transaction is successful, the process progresses to the next transaction 140 (e.g., DHCP transaction). On the other hand, when the authentication fails, the process ends, and other fields of the time series table is filled with the analytics information and sent to the cloud computing device.

In some embodiments, the computing device performs analytics to track real-time issues with the wireless connection to minimize computation efforts at the cloud computing device. For instance, the result type 150 and type of failure 160 may be identified based on the first timestamp and the second timestamp by the computing device. As one example, the computing device may determine that the transaction type for the authentication is a "slow transaction" upon determining that the time it takes to complete the authentication took longer than an average cycle but less than the threshold value. In another example, the computing device may determine that the transaction type for the authentication is a "failed transaction" upon determining that the time it takes to complete the authentication is longer than the threshold value. The computing device may further determine that the result type is "failed" and the type of failure is "802x_1 authentication failure" based on the identified timestamps. The analytics are stored in the record and sent to the cloud computing device.

FIG. 2 illustrates processes for a client event sequence.

The event sequence can start at step 200. The sequence can start upon receiving a wireless networking access point association request from a client device to connect to the Wi-Fi network.

At step 210, when the association request is received, the time series record is generated at the computing device. The time series record includes multiple fields to include timestamp information and the analytics for each transaction. The time series record can include timestamp information for the start time and end time of each transaction, completion time calculated based on the timestamps for the start time and the end time, and the analytics for the transaction result and type of failure. Other types of analytics can be included in the time series record based upon the network configuration.

At step 220, if it is determined that the authentication transaction is successfully performed, the process proceeds to the next transaction (e.g., DHCP transaction). On the other hand, upon determining that the authentication is not successfully performed, the process ends with a failure and a data frame with a type of failure is determined by the computing device and sent to the cloud computing device at step 250. The computing device determines the transaction type (e.g., failed transaction), result type (e.g., failed) and failed reason (e.g., wrong password). Exporting the transaction-based analytics to the cloud computing device can reduce the amount of traffic that needs to be analyzed by the cloud computing device.

At step 230, it is determined that the DHCP transaction is successfully performed. The computing device may use a timer for the DHCP transaction to determine the time it takes to complete the DHCP transaction. The timer for the DHCP transaction may be different from a timer for the authentication transaction. Therefore, the timeout threshold for the DHCP transaction can be different from the timeout threshold for the authentication transaction. When the timer for the DHCP process expires, the computing device determines that the process ends with a failure (e.g., failed transaction) and the data frame with the analytics for failure is sent to the cloud computing device at step 250. The data frame for the DHCP failure may include different information from the data frame for the authentication failure. The data frame for the authentication failure is sent to the cloud computing device before the data frame for the DHCP failure is sent to the cloud computing device and may not include any information for the DHCP transaction.

At step 240, upon determining that all the steps in the client event sequence are completed successfully, the process ends at a total state and the client device may be at a run state. Each transaction in the client event sequence can be repeated to go through multiple state machine transitions to ensure that an association attempt from the client device is successful. The client event sequence illustrated in FIG. 2 is not an exclusive list and may include other connection transactions.

2.3 Example Processes and Algorithms

Figure 3:
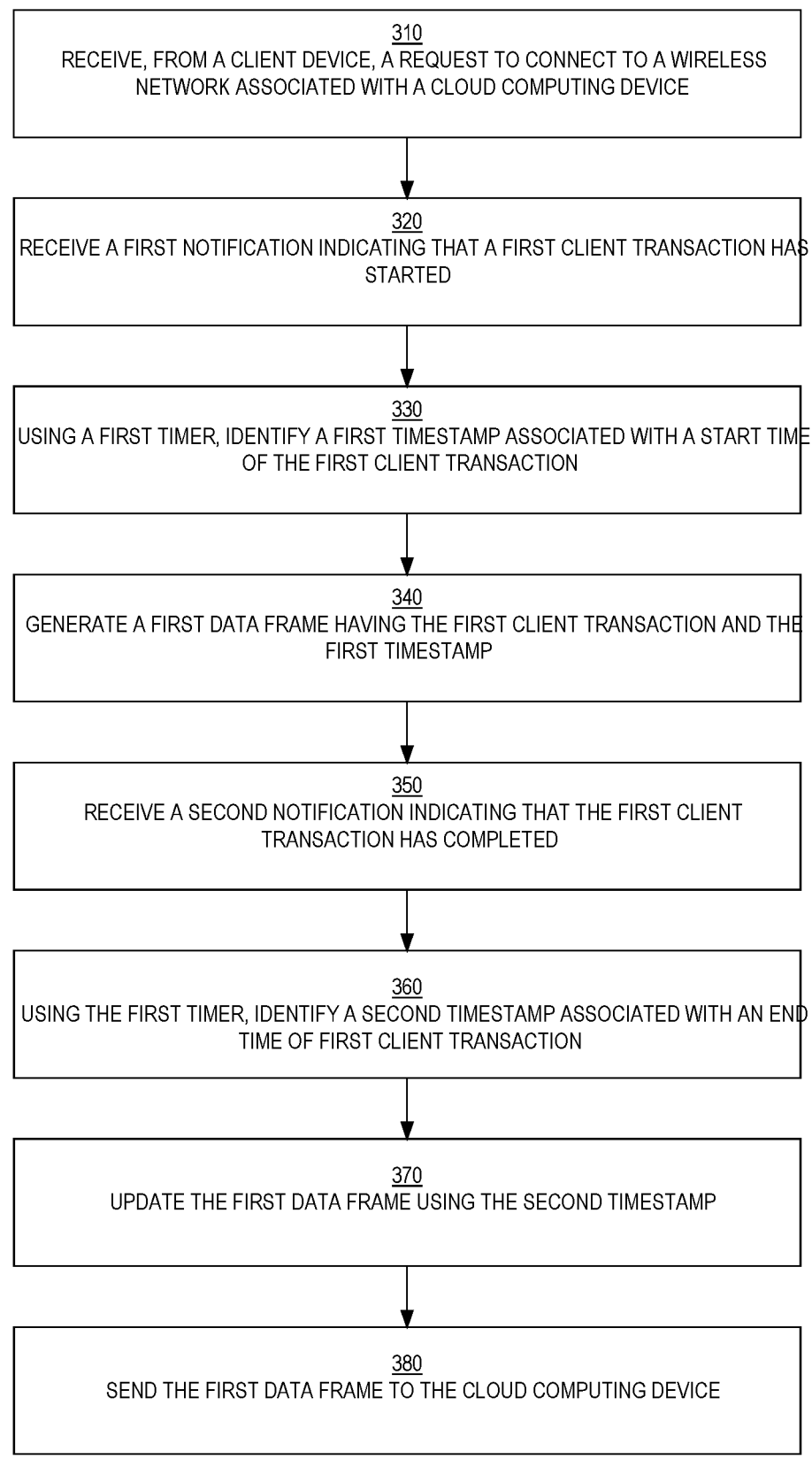
FIG. 3 illustrates an example of exporting client event data based on a transaction to a cloud platform.

FIG. 3 illustrates an example of exporting transaction-based client event data to a cloud platform. FIG. 3 is intended to disclose an algorithm or functional description that may be used as a basis of writing computer programs to implement the functions that are described herein, and which cause a computer to operate in the new manner that is disclosed herein. The steps of the process may be performed in any order and are not limited to the order shown in FIG. 3.

At step 310, communication with the computing device begins. For example, a request is received from a client device to connect to a wireless network associated with a cloud computing device. The process can be performed by a computing device that is different from the cloud computing device. In some embodiments, the computing device can be an edge computing device such as a router or switch, or a network management station.

At step 320, a first notification is received to indicate that a first client transaction has started. Upon receiving the first notification, a time series record can be generated to store transaction information. In some embodiments, the first client transaction may include any of a wireless networking access point association request, an authentication request, roaming request or Dynamic Host Configuration Protocol (DHCP) request.

At step 330, using a first timer, a first timestamp associated with a start time of the first client transaction is identified. Using the real-time statistics such as the first timestamp can accurately track the client state and minimize the traffic that gets lost in the transmission.

At step 340, a first data frame having the first client transaction and the first timestamp is generated. The first data frame can be populated in the time series record and may include other fields to store transaction information. The other fields for the transaction information can be filled as the client event progresses.

At step 350, a second notification indicating that the first client transaction has completed is received. The second notification can indicate a completion status of the first transaction. For example, a first type of the second notification can represent a "successful transaction". The first type of the second transaction indicates that the first transaction has been completed and the process continues to the next transaction. A second type of the second notification can represent a "slow transaction". The second type of the second notification indicates that the time taken to complete the first transaction was above a threshold value for the first transaction but below the average cycle. In another embodiment, the "slow transaction" may still progress to the next transaction.

A third type of the second notification can represent a "failed transaction". The "failed transaction" indicates that the first transaction was not completed and the process ends. The fourth type of the second notification can represent an "incomplete transaction". The incomplete transaction indicates that the process may still be ongoing. Other transaction types are available based on the network configuration.

At step 360, using the first timer, a second timestamp associated with an end time of the first client transaction is identified. Upon receiving the second notification indicating the completion status of the first transaction, the second timestamp can be used to record the completion or incompletion time (e.g., timed out) of the first transaction. By calculating the first timestamp and the second timestamp, the computing device calculates the time that it takes to complete the first transaction and stores the time information in the time series table. If the first transaction was not completed before the first timer expires, it is determined that the first transaction was timed out and the transaction was not successful. Other analytics related to the failed transaction may be determined.

At step 370, using the second timestamp, the first data frame is updated using the second timestamp. In some embodiments, each transaction in the client event sequence can go through multiple repetitions to ensure that the connection from the client to the network is secured.

At step 380, the first data frame is sent to the cloud computing device. By sending the real-time transaction-based first data frame to the cloud computing device, it can reduce the compute complexity on the cloud computing device, optimizing the bandwidth consumption and minimizing the traffic that goes into the cloud computing device.

Using these approaches, accurate client state data is collected to represent the end user's experience by mirroring a client's attempt to connect to the wireless network. Using the transaction-based model provides more accurate metrics for generating insights for monitoring client events. These approaches have the benefit of achieving real-time scalable insights when real-time analytics are performed at the computing device which is different from the cloud computing device, using as little computing resources as possible on the cloud platform. Furthermore, the transaction-based mechanism optimizes the bandwidth consumption and reduces the computational complexity at the cloud platform. The transaction-based tracking mechanism streamlines the processes and reduces the memory footprint regardless of the encoding mechanism.

3. Implementation Mechanisms-Hardware Overview

Figure 4:
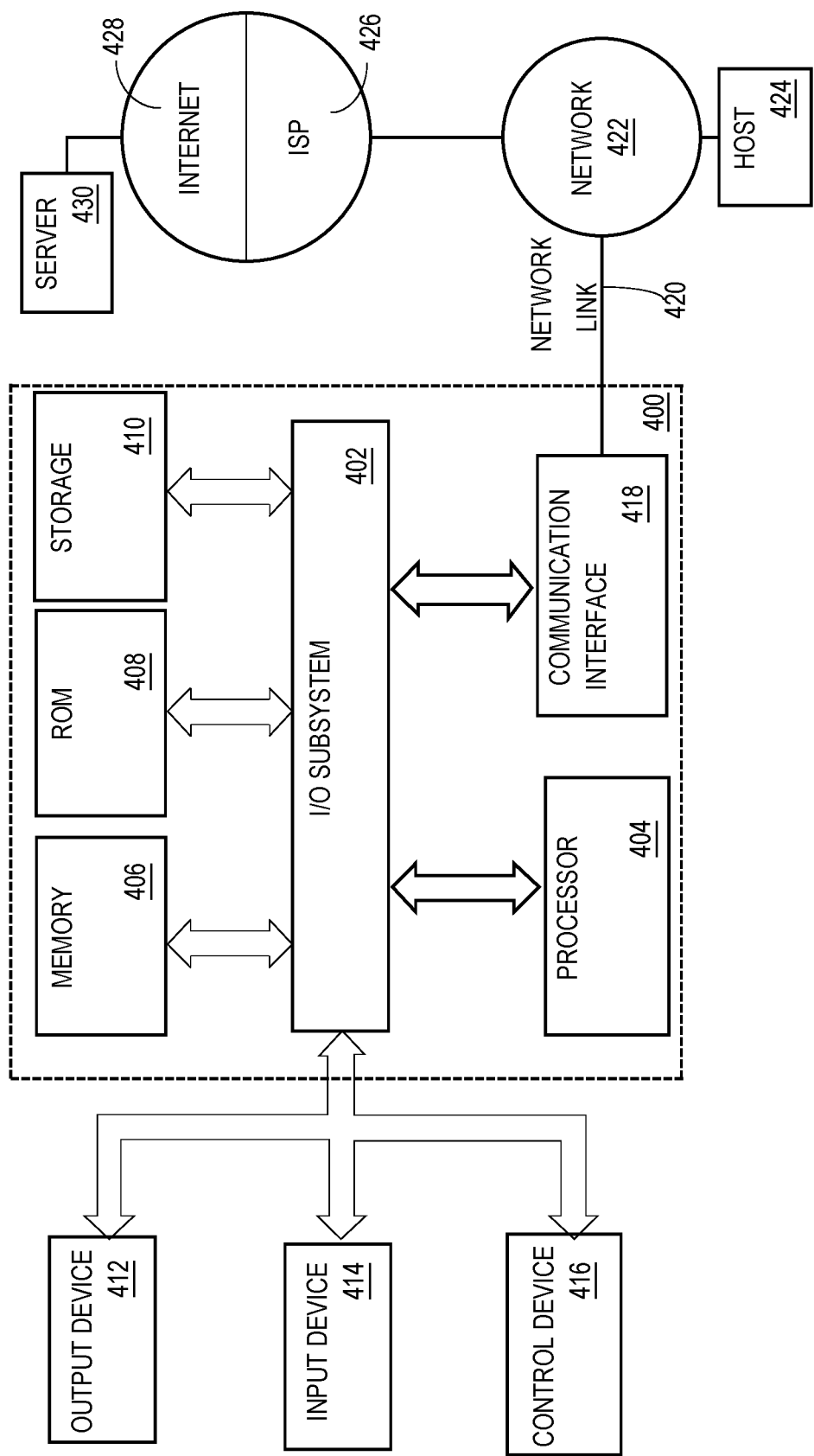
FIG. 4 illustrates an example computer system with which an embodiment may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on output device (e.g., display) 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC, GPU, or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present embodiments have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A computer-implemented method, comprising:
   receiving, at computing device and from a client device, an indication of a request by the client device to connect to a wireless network in which the computing device is located;
   receiving, at the computing device, a first notification indicating that a first client transaction has started, the first client transaction associated with connecting the client device to the wireless network;
   identifying, at the computing device, a first timestamp associated with a start time of the first client transaction;
   generating, at the computing device, a first data frame indicating the first client transaction and the first timestamp;
   receiving, at the computing device, a second notification indicating that the first client transaction has completed;
   identifying, at the computing device, a second timestamp associated with an end time of the first client transaction;
   identifying a result of the first client transaction;
   updating, at the computing device, the first data frame to indicate the second timestamp and the result of the first client transaction; and
   by the computing device, sending the first data frame to a cloud computing device associated with a cloud analytics platform.

2. The computer-implemented method of claim 1, wherein the first client transaction comprises any of a wireless networking access point association request, an authentication request, a roaming request or a Dynamic Host Configuration Protocol (DHCP) request.

3. The computer-implemented method of claim 1, wherein the computing device is an edge computing device.

4. The computer-implemented method of claim 1, further comprising:

determining, by the computing device, a client state associated with the first client transaction based on the start time and the end time of the first client transaction, the client state indicating a status of the first client transaction.

5. The computer-implemented method of claim 1, after sending the first data frame to the cloud computing device, further comprising:
   by the computing device, receiving a third notification indicating a second client transaction which is different from the first client transaction has started, wherein the second client transaction is subsequent to the first client transaction in a series of transactions;
   by the computing device a timer, identifying a third timestamp associated with a start time of the second client transaction; and
   by the computing device, generating a second data frame having the second client transaction and the third timestamp.

6. The computer-implemented method of claim 5, further comprising:
   by the computing device, determining that the timer has expired;
   upon determining that the timer has expired, receiving a fourth notification indicating that the second client transaction has failed;
   by the computing device, using the timer, identifying a fourth timestamp associated with a failed time of the second client transaction;
   by the computing device, updating the second data frame using the fourth timestamp; and
   by the computing device, sending the second data frame to the cloud computing device.

7. The computer-implemented method of claim 6, wherein sending the second data frame to the cloud computing device is performed after sending the first data frame.

8. The computer-implemented method of claim 6, further comprising:
   determining, by the computing device, a client state associated with the second client transaction based on the start time and the end time of the second client transaction; and
   diagnosing a failure type associated with the second client transaction based on the client state of the second client transaction.

9. One or more non-transitory computer-readable storage media storing instructions that, when executed by one or more processors, perform a method comprising:
   receiving, from a client device, a request to connect to a wireless network monitored by a cloud computing device;
   receiving a first notification indicating that a first client transaction has started, the first client transaction included in an association between the client device and the wireless network;
   identifying a first timestamp associated with a start time of the first client transaction;
   generating a first data frame indicating the first client transaction and the first timestamp;
   receiving a second notification indicating that the first client transaction has completed;
   identifying a second timestamp associated with an end time of the first client transaction;
   identifying a result of the first client transaction;
   updating the first data frame using the second timestamp and the result of the first client transaction; and
   sending the first data frame to the cloud computing device.

10. The one or more non-transitory computer-readable storage media of claim 9, wherein the first client transaction comprises any of a wireless networking access point association request, an authentication request, a roaming request or a Dynamic Host Configuration Protocol (DHCP) request.

11. The one or more non-transitory computer-readable storage media of claim 9, wherein the request is received at an edge computing device.

12. The one or more non-transitory computer-readable storage media of claim 9, when executed, the method further comprising:
    determining a client state associated with the first client transaction based on the start time and the end time of the first client transaction, the client state indicating a status of the first client transaction.

13. The one or more non-transitory computer-readable storage media of claim 9, when executed, the method further comprising:
    receiving a third notification indicating a second client transaction different from the first client transaction has started, wherein the second client transaction is subsequent to the first client transaction in a series of transactions;
    using a timer, identifying a third timestamp associated with a start time of the second client transaction; and
    generating a second data frame having the second client transaction and the third timestamp.

14. The one or more non-transitory computer-readable storage media of claim 13, when executed, the method further comprising:
    determining that the timer has expired;
    upon determining that the timer has expired, receiving a fourth notification indicating that the second client transaction has failed;
    using the timer, identifying a fourth timestamp associated with a failed time of the second client transaction;
    updating the second data frame using the fourth timestamp; and
    sending the second data frame to the cloud computing device.

15. The one or more non-transitory computer-readable storage media of claim 14, wherein sending the second data frame to the cloud computing device is performed after sending the first data frame.

16. The one or more non-transitory computer-readable storage media of claim 14, when executed, the method further comprising:
    determining a client state associated with the second client transaction based on the start time and the end time of the second client transaction; and
    diagnosing a failure type associated with the second client transaction based on the client state of the second client transaction.

17. A system comprising:
    a processor; and
    a memory storing instructions that, when executed by the processor, cause the processor to:
    receive, from a client device, a request to connect to a wireless network monitored by a cloud computing device;
    receive a first notification indicating that a first client transaction has started, the first client transaction associated with connecting the client device to the wireless network;

identify a first timestamp associated with a start time of the first client transaction;

generate a first data frame indicating the first client transaction and the first timestamp;

receive a second notification indicating that the first client transaction has completed;

identify a second timestamp associated with an end time of the first client transaction;

identify a result of the first client transaction;

update the first data frame using the second timestamp and the result of the first client transaction; and send the first data frame to the cloud computing device.

18. The system of claim 17, wherein the first client transaction comprises any of a wireless networking access point association request, an authentication request, a roaming request or a Dynamic Host Configuration Protocol (DHCP) request.

19. The system of claim 17, wherein the request is received at an edge computing device.

20. The system of claim 17, when executed, further cause the processor to determine, a client state associated with the first client transaction based on the start time and the end time of the first client transaction, the client state indicating a status of the first client transaction.

* * * * *